(12) United States Patent
Piini et al.

(10) Patent No.: US 8,777,156 B2
(45) Date of Patent: Jul. 15, 2014

(54) HEAVIER THAN AIR INTERNAL BALLAST

(75) Inventors: Nicholas Piini, Palmdale, CA (US);
Alex Siler, Lancaster, CA (US); Joseph Kinkopf, Lancaster, CA (US); Caitlyn Fahey, Rosamond, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 203 days.

(21) Appl. No.: 13/091,095

(22) Filed: Apr. 20, 2011

(65) Prior Publication Data
US 2012/0267474 A1 Oct. 25, 2012

(51) Int. Cl.
*B64B 1/70* (2006.01)
*B64C 17/08* (2006.01)

(52) U.S. Cl.
USPC ............ 244/94; 244/96; 244/97; 244/99

(58) Field of Classification Search
USPC ............ 244/24, 94–99, 128, 30, 31
See application file for complete search history.

(56) References Cited

U.S. PATENT DOCUMENTS

| | | | |
|---|---|---|---|
| 998,538 A | 7/1911 | Lehmann | |
| 1,853,376 A | 9/1921 | Powelson et al. | |
| 1,577,756 A | 3/1926 | Reagan | |
| 1,972,242 A | 1/1931 | Morse | |
| 2,904,285 A | 6/1956 | Huch | |
| 3,531,064 A | 9/1970 | McCutchan | |
| 3,972,492 A | 8/1976 | Milne | |
| 4,272,042 A | 6/1981 | Slater | |
| 5,348,251 A | 9/1994 | Ferguson | |
| 5,645,248 A * | 7/1997 | Campbell | 244/30 |
| 6,425,552 B1 | 7/2002 | Lee et al. | |
| 6,648,272 B1 | 11/2003 | Kothmann | |
| 7,156,342 B2 | 1/2007 | Heaven, Jr. et al. | |
| 7,356,390 B2 | 4/2008 | Knoblach et al. | |
| 7,469,857 B2 | 12/2008 | Voss | |
| 7,871,035 B2 * | 1/2011 | Arel | 244/98 |
| 2006/0065777 A1 | 3/2006 | Walden et al. | |
| 2007/0069077 A1 | 3/2007 | Colting | |
| 2009/0072082 A1 * | 3/2009 | Arel | 244/66 |

FOREIGN PATENT DOCUMENTS

| | | |
|---|---|---|
| GB | 159 079 | 2/1921 |
| GB | 2 417 472 | 3/2006 |
| WO | WO 2006/119056 | 11/2006 |

OTHER PUBLICATIONS

Ennis, William B., "In the Building of Balloons," The Automobile, Dec. 29, 1910, pp. 1080-1081.

* cited by examiner

*Primary Examiner* — Philip J Bonzell
(74) *Attorney, Agent, or Firm* — McDermott Will & Emery LLP

(57) ABSTRACT

A vehicle suitable for use in high-altitude applications use may include a gas impermeable body and a flexible barrier separating the body into multiple sections or compartments. The compartments may include a lift compartment for holding lift gas, such as lighter than air gas, and a ballast compartment for holding a ballast, such as heavier than air gas. A valve may permit passage of the ballast from the ballast compartment to an exterior of the body. The body may have an oblong shape, with fins attached to an exterior back end thereof. The vehicle may have only internal ballast compartments, without including a hopper external to the body.

16 Claims, 3 Drawing Sheets

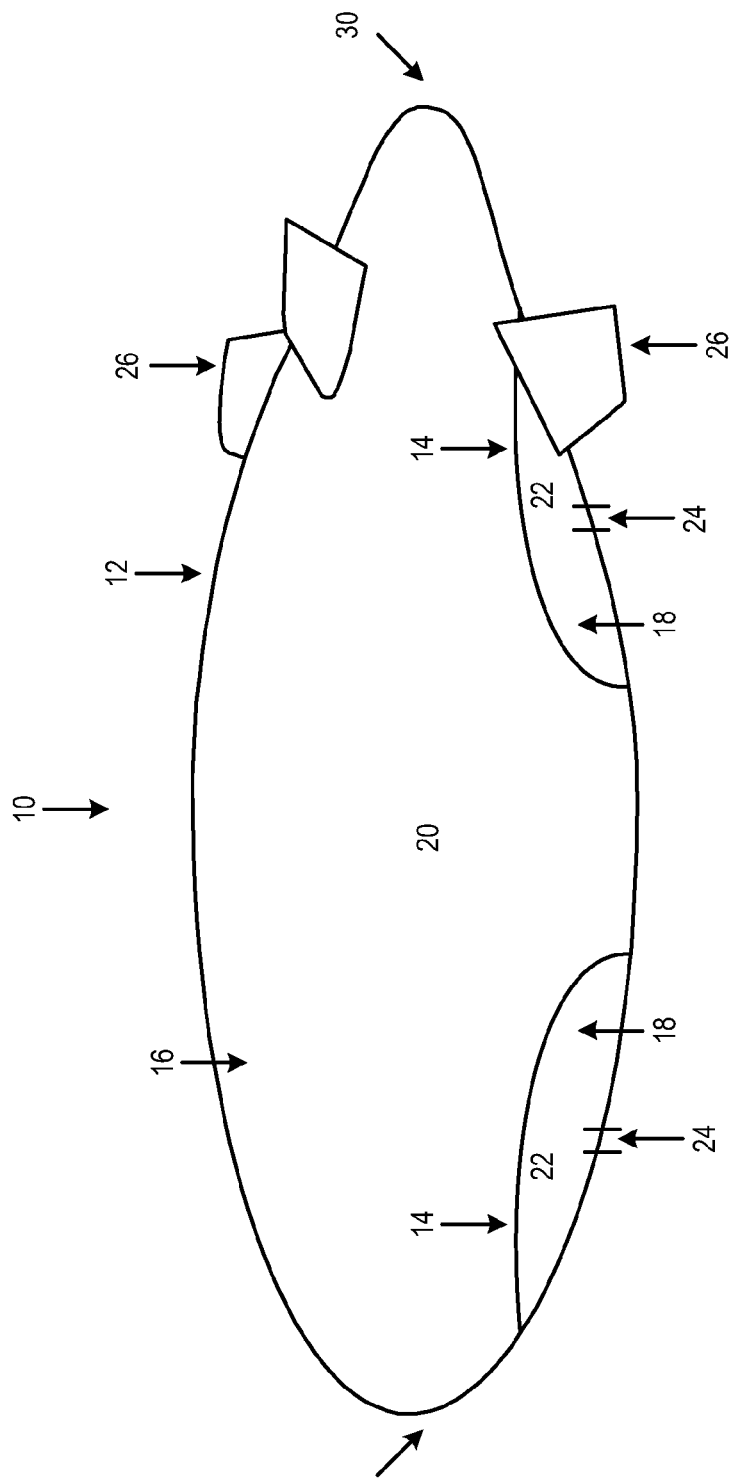

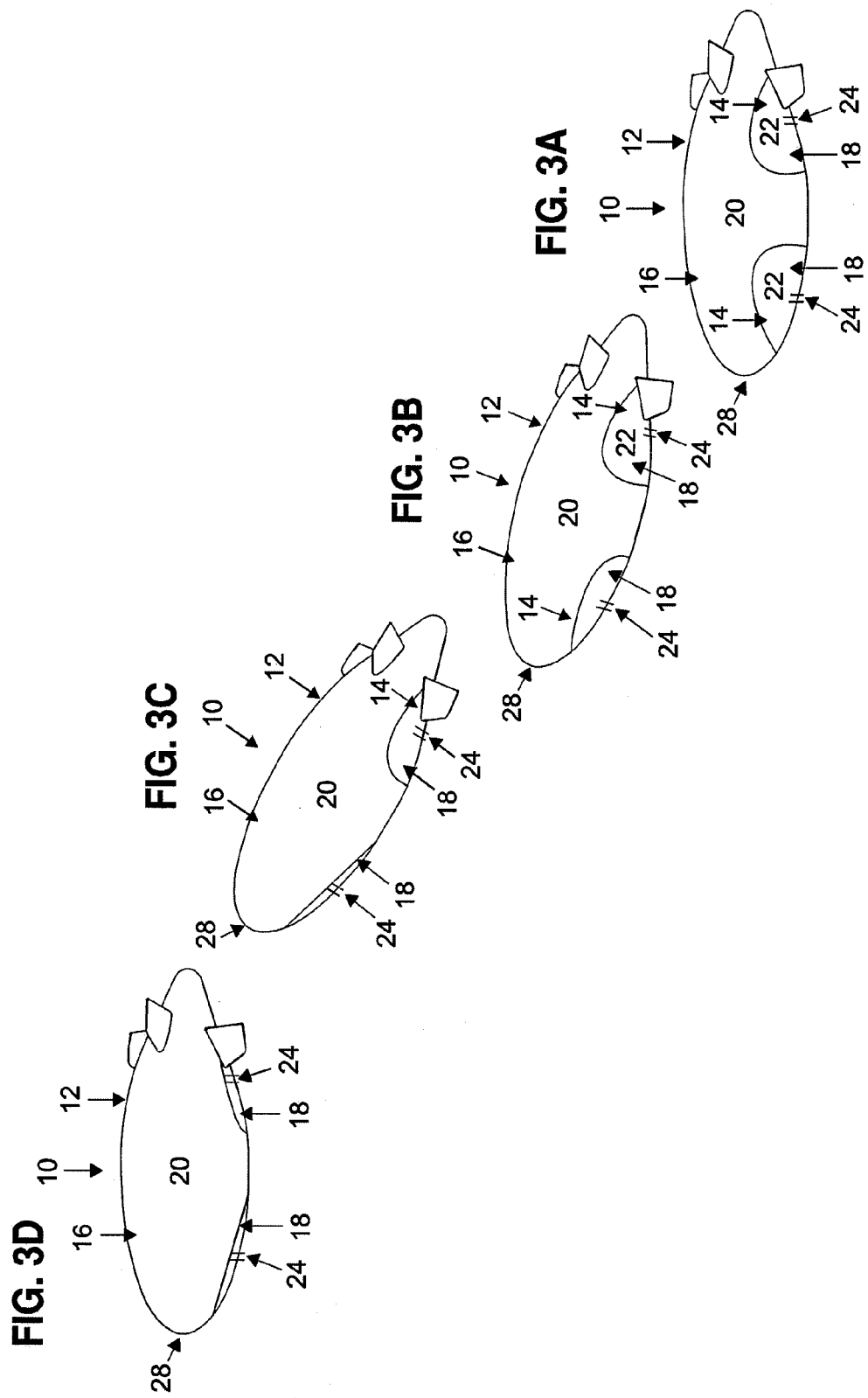

HEAVIER THAN AIR INTERNAL BALLAST

STATEMENT AS TO RIGHTS TO INVENTIONS MADE UNDER FEDERALLY SPONSORED RESEARCH OR DEVELOPMENT

This invention was made with Government support under Contract Number HR0011-09-C-0036 awarded by The Department of Defense Advanced Research Projects Agency. The Government has certain rights in this invention.

FIELD

The present disclosure generally relates to lighter than air vehicles and, in particular, relates to ballast systems for lighter than air vehicles.

BACKGROUND

In lighter than air vehicles, such as the vehicle 1 shown in FIG. 1, temperature and pressure changes resulting from altitude changes and varying atmospheric conditions may cause lift gas inside a hull of the vehicle 1 to expand or contract, resulting in a constantly varying volume of lift gas. To maintain a constant internal pressure, such vehicles may have one or more ballonets (not shown) within the hull 2. The ballonets may react to changes in volume by passively discharging air to or accepting air from the atmosphere, to maintain hull pressure within acceptable limits, to maintain hull shape. Additionally, the vehicle 1 may have ballast, in order to manage the large buoyancy difference between the launch and operational elevations. In high-altitude vehicles, fully inflated at launch, large ballast loads may be required. The ballast (such as fluid or sand) may be stored in a hopper 3 and a release mechanism may allow the ballast to be drained or jettisoned from the hopper during assent as needed. However, such configuration may impart large local loading at the attachment side, and therefore a large scar (i.e., drag-inducing) support structure to distribute the load into the hull 2 may be required. The supporting structure, hopper 3, and ballast release mechanism remain permanently affixed to the hull 2 after the ballast is jettisoned, imparting a large scar mass, adversely affecting performance. Additionally, due to the external location of the system, increased drag may result throughout the flight, even after the ballast has been drained from the hopper 3. High altitude flight may require larger hoppers, resulting in further loss of efficiency.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that will be presented later.

According to various aspects of the subject technology, a vehicle suitable for use in high-altitude applications use may include a gas impermeable body and a flexible barrier separating the body into multiple sections or compartments. The compartments may include a lift compartment for holding lift gas, such as lighter than air gas, and a ballast compartment for holding a ballast, such as heavier than air gas. A valve may permit passage of the ballast from the ballast compartment to an exterior of the body. The body may have an oblong shape, with fins attached to an exterior back end thereof. In some aspects, the vehicle may have only internal ballast compartments, without including a hopper external to the body.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 2 is a cross-sectional view of a lighter than air vehicle in accordance with one aspect of the present disclosure.

FIG. 3A is a side view of a position of a lighter than air vehicle in accordance with one aspect of the present disclosure.

FIG. 3B is a side view of another position of the lighter than air vehicle of FIG. 3A in accordance with one aspect of the present disclosure.

FIG. 3C is a side view of another position of the lighter than air vehicle of FIGS. 3A and 3B in accordance with one aspect of the present disclosure.

FIG. 3D is a side view of another position of the lighter than air vehicle of FIGS. 3A, 3B, and 3C in accordance with one aspect of the present disclosure.

DETAILED DESCRIPTION

Figure 1:
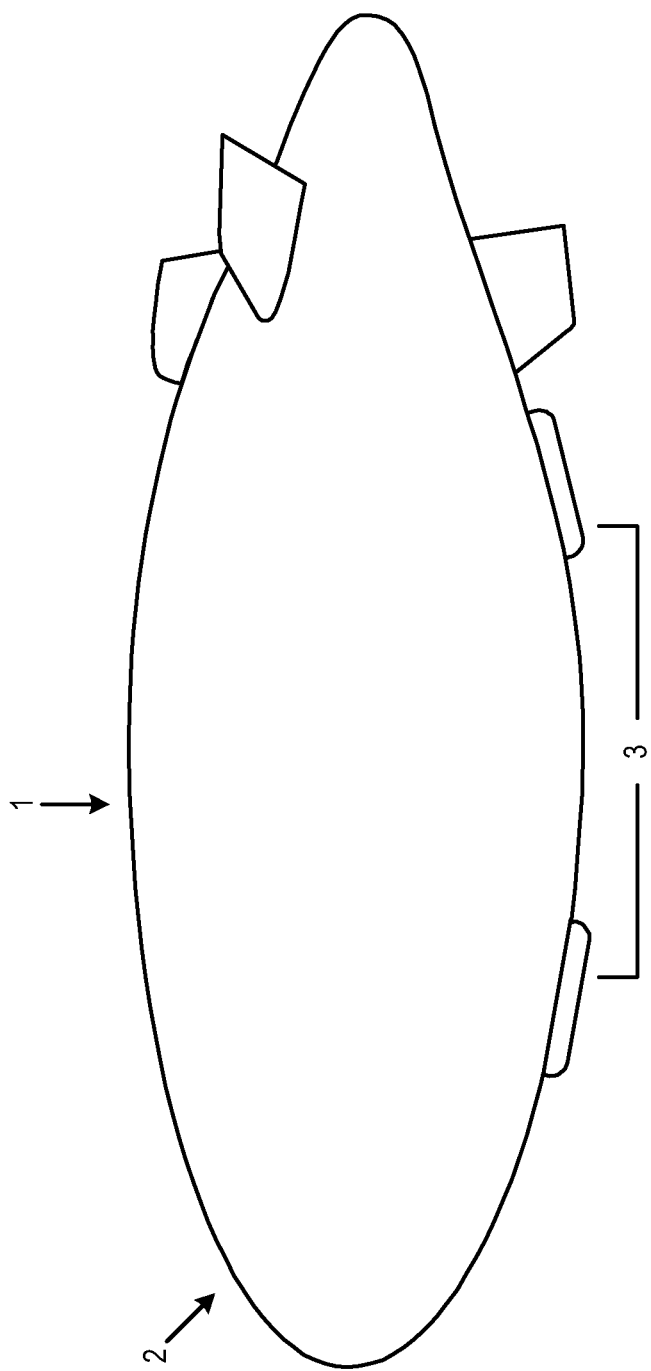
FIG. 1 is a perspective view of a conventional lighter than air vehicle.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology. Like components are labeled with identical element numbers for ease of understanding.

Referring now to FIG. 2, a simplified diagram of a vehicle 10 is illustrated in accordance with one aspect of the present disclosure. The vehicle 10 may include a hull or body 12, a barrier 14 separating the body 12 into a lift compartment 16 and one or more ballast compartments 18, and a valve allowing fluid communication between the ballast compartment 18 and an exterior of the body 12. In such a configuration, the ballast compartment 18 may be within the body 12, which may be a change from the hopper 3 outside of vehicle 1 illustrated in FIG. 1. Such a configuration may allow for effective management of the buoyancy of the vehicle 10 by controlling the net mass, while reducing local loading and drag, and saving overall scar mass. In particular, locating the ballast compartment 18 within the body 12, there may be little or no contact with the external air stream, and therefore vehicle drag due to the ballast system may be eliminated.

Referring again to FIG. 2, the body 12 may be simi-rigid or non-rigid and formed of a skin or gas impermeable material, such as woven polyester, polyamide, or aramid fibers. Body 12 may include laminates of a variety of materials to provide a variety of functions. For example, these laminates may have an outer environmental/weathering layer such as a polyvinylfluoride film (e.g., Tedlar), a gas retention layer such as a polyester film (e.g., Mylar), and load bearing layer such as polyester fabric (e.g., Vectran). The body 12 may be of monocoque construction or may otherwise be constructed in a manner such that the body 12 is suitable for use in high altitudes, including very high altitudes such as, but not limited to, stratospheric operations. Thus, the vehicle 10 may be a high altitude vehicle, suitable for use at altitudes of greater than 5 miles, greater than 10 miles, greater than 20 miles, or greater than 30 miles. The shape of the body 12, as illustrated in FIG. 2, may be oblong, so as to provide a profile to launch and/or navigate efficiently. However, other shapes, such as a spherical shape, or an inverse-teardrop shape may also be suitable, so long as the body 12 provides sufficient volume for the intended use.

One or more flexible barriers 14 may be attached to the body 12, or may otherwise separate an interior of the body 12 into a lift compartment 16 and one or more ballast compartments. The flexible barrier 14 may be constructed of a gas impermeable fabric, such as lightweight nylon or polyester scrib coated on both sides with polyurethane, or other flexible material. The flexible barrier 14 may be designed to collapse or otherwise shrink into the ballast compartment 18, and conform to the body 12, allowing maximum volume of the lift compartment 16.

The lift compartment 16 may hold, contain, or otherwise house a lighter than air gas 20 such as, but not limited to, helium, hydrogen, heated air, and/or oxygen. The lighter than air gas 20 may partially or completely fill the lift compartment 16. The size of the lift compartment 16, and thus the body 12 may vary, depending on the lift capacity required for a particular application.

The ballast compartment 18 may be wholly contained within the body 12, such that the overall shape of the vehicle 10 is aerodynamic, and has a low scar mass. The ballast compartment 18 may hold, contain, or otherwise house ballast 22. The size, configuration, and number of ballast compartments may vary, depending on the parameters of a particular application. When multiple ballast compartments are present, they may be positioned in any of a number of configurations. For example, ballast compartments may be positioned at opposite ends of the body 12 (e.g., at a front end 28 and a back end 30) to allow for pitch control, and/or on opposite sides of the body 12 (e.g., on a right side and a left side) to allow for roll control. When multiple ballast compartments are used, the ballast 22 may include different materials in each, or the ballast 22 may be the same among all ballast compartments. Suitable materials for the ballast 22 may include, but are not limited to, oxygen, carbon dioxide, other gases such as sulfur hexafluoride, sand, water, or other gas, fluid, solid, and/or mixture thereof. Thus, the ballast 22 may include any substance or material that is heavier than air. The selection of the ballast 22 may be tailored to the particular design of the vehicle 10, including the contents of the lift compartment 16, the payload, and other design considerations. Because the ballast compartment 18 may lie within the body 12, there may be no need for a hopper external to the body 12. Configurations excluding an external hopper may result in a reduction in support structure mass of the vehicle 10, allowing for larger payloads or reduction of the lighter than air gas 20 for a similar payload.

One or more valves 24 may be configured to permit passage of a portion of the ballast 22 from the ballast compartment 18 to an exterior of the body 12. The valve 24 may be a one-way discharge valve that selectively permit flow of the ballast 22 from the ballast compartment 18 to the exterior of the body 12. Thus, the valve may be configured to open at a predetermined threshold. The predetermined threshold may include a set point based on any of a number of factors, including altitude, pressure, etc. In some aspects, the set point may be a pressure differential between an interior of the body 12 and the exterior of the body 12. While the pressure between the lift compartment 16 and the ballast compartment 18 may maintain equilibrium, the pressure of the interior of the body 12 (i.e., the equilibrium pressure of the lift compartment 16 and the ballast compartment 18) may differ from the pressure of the exterior of the body 12. More specifically, as the vehicle 10 ascends, the pressure of the exterior of the body 12 decreases while the pressure of the interior of the body 12 remains substantially constant. Once the differential pressure between the interior and the exterior of the body 12 is large enough, the valve 24 may open. For example, the valve 24 may be a check valve that automatically actuates at a preset differential. In other words, on assent, internal pressure within the lift compartment 16 may apply pressure to the ballast compartment 18, forcing ballast 22 through a check valve or other valve, causing ballast 22 to be released.

Once open, the valve 24 may release the ballast 22 to the exterior of the body 12. The valve 24 may be positioned in the body 12 at a location within the respective ballast compartment 18, such that the flow through the valve 24 allows the ballast 22 to pass directly from the ballast compartment 18 to the exterior of the body 12. Alternatively, a tube, or other form of communication through a portion of the lift compartment 16 may be provided, to allow the ballast 22 to pass indirectly from the ballast compartment 18 to the exterior of the body 12. However, it may be desirable to prevent any mixing between the ballast 22 in the ballast compartment 18 and the lighter than air gas 20 in the lift compartment 16. The passage of the ballast 22 out of the ballast compartment 18 may cause a decrease in the overall weight of the vehicle 10, causing the vehicle 10, or a portion thereof to ascend. When the ballast 22 is released from the ballast compartment 18, the pressure of the lift compartment 16 and the ballast compartment 18 may equalize, causing the flexible barrier 14 to move or contract into the space of the ballast compartments 18, effectively reducing the volume of the ballast compartment 18 while increasing the volume of the lift compartment 16.

The vehicle 10 may further include fins 26 to provide stability during flight, along with propulsion devices (not shown) configured to provide desired positioning of the vehicle 10. The fins 26 may be attached or otherwise positioned at an exterior of the back end 30, or elsewhere, as appropriate. The propulsion devices may be positioned at opposite ends or at opposite sides of the body 12. The vehicle 10 may also include a cabin or other housing (not shown) for a payload. Such housing may be coupled to the body 12 in any of a number of locations, depending on design considerations. The vehicle 10 may additionally include at least one ballonet (not shown), which may pass air to and/or from the exterior of the body 12 and regulate pressure therein. Such ballonet may operate before, after, or simultaneously with the ballast compartment 18. Further, in some aspects, the ballast compartment 18 may be used as ballonet after the ballast 22 has been discharged, by passing air to and/or from the exterior of the body 12.

Referring now to FIGS. 3A-3D, along with FIG. 2 for detail, in accordance with some aspects of the present disclosure, methods of controlling the vehicle 10 may include providing the vehicle 10 described above, and placing lighter than air gas 20 in the lift compartment 16, placing ballast 22 in the ballast compartment 18. In some aspects, the lighter than air gas 20 may be placed in the lift compartment 16 prior to ballast 22 being placed in the ballast compartment 18, such that the lighter than air gas 20 is compressed as the ballast 22 enters the ballast compartment 18 and provides pressure on the flexible barrier 14. In other aspects, the ballast 22 may be placed in the ballast compartment 18 first, such that the lighter than air gas 20 provides pressure on the flexible barrier 14. In yet other aspects, the lighter than air gas 20 and the ballast 22 may be loaded simultaneously.

Once the lighter than air gas 20 and the ballast 22 are in place in the vehicle 10, the vehicle 10 may be launched (FIG. 3A). At this point, the vehicle 10 may have neutral buoyancy (i.e., zero heaviness), with the ballast 22 being fully inflated, such that the ballast compartment 18 is at full capacity. The valve 24 may then be opened, thereby releasing a portion of the ballast 22 from the ballast compartment 18 to the exterior of the body 12 (FIGS. 3B and 3C). The opening of the valve 24 may include allowing the valve 24 to open at one or more set points as described above. In the example illustrated, a forward or "fore" ballast compartment 18 drains, or releases ballast 22 first (FIG. 3B), causing the front end 28 of the vehicle 10 to lift relative to the rest of the vehicle 10 (i.e., pitch up). The ballast 22 may be partially or wholly released from the "fore" ballast compartment, such that the flexible barrier 14 associated with the "fore" ballast compartment lies against the body 12 of the vehicle 10, allowing the lighter than air gas 20 to occupy a larger volume. Thus, as ballast 22 is exhausted, the volume of the lift compartment 16 may increase. Then, a rear ballast compartment 18 releases ballast (FIG. 3C), which may result in all ballast 22 being exhausted from the vehicle 10. Again, the flexible barrier 14 associated with the ballast compartment 18 may lie against the body 12, increasing the volume of the lift compartment 16. The vehicle 10 may then level out (FIG. 3D) at an operating elevation. While the method described herein involves a forward ballast compartment 18 releasing ballast 22 before a rear ballast compartment 18 releases ballast 22, in some aspects, various ballast compartments may release ballast simultaneously or in any of a number of orders. Thus, the sequence of opening of the valves, and thus releasing of the ballast 22 from the various ballast compartments may allow for control and/or change of the elevation, pitch, or roll of the vehicle 10. Additionally, while two ballast compartments are illustrated, any number of ballast compartments may be used, in series, in parallel, or otherwise. In some aspects, multiple ballast compartments may be joined, effectively creating a larger ballast compartment. Likewise, multiple lift compartments may be used in a number of configurations, including multiple compartments joined together. Similarly, and multiple valves or valving may be used in various configurations, and multiple flexible barriers may be used in various configurations.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like, as used in this disclosure, should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any aspect described herein as "exemplary" is not necessarily to be construed as preferred or advantageous over other aspects.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A vehicle comprising:
   a gas impermeable body;
   a heavier than air gas having a composition that is different from air;
   a flexible barrier comprising a lightweight nylon or polyester scrim attached internally to the body and separating the body into a lift compartment configured to hold a lighter than air gas and a ballast compartment configured to hold the heavier than air gas; and
   a one-way discharge valve positioned within the ballast compartment and configured to open and to permit passage of the heavier than air gas from the ballast compartment to an exterior of the body at a predetermined threshold based on a pressure differential between an interior of the body and the exterior of the body caused by the ascent of the vehicle,
   wherein, upon release, through the one-way discharge valve, of the heavier than air gas from the ballast compartment, the flexible barrier moves, allowing the volume of the lift compartment to increase as the volume of the ballast compartment decreases.

2. The vehicle of claim 1, wherein the lift compartment is configured to hold helium or hydrogen.

3. The vehicle of claim 1, wherein the body comprises woven polyester, polyamide, or aramid fibers.

4. The vehicle of claim 1, wherein the lightweight nylon or polyester scrim is coated on both sides with polyurethane.

5. The vehicle of claim 1, wherein the one-way discharge valve is further configured to selectively permit flow of the heavier than air gas directly from the ballast compartment to an exterior of the body when a predetermined altitude has been reached by the vehicle.

6. The vehicle of claim 1, wherein the heavier than air gas comprises at least one of carbon dioxide or sulfur hexafluoride.

7. The vehicle of claim 1, comprising:
an additional flexible barrier, such that the flexible barrier and the additional flexible barrier separate the body into the lift compartment, the ballast compartment, and an additional ballast compartment configured to hold a ballast; and
one or more valves configured to permit fluid communication between the additional ballast compartment and the exterior of the body such that the one or more valves are configured to pass air into and out of the additional ballast compartment after the ballast has been discharged.

8. The vehicle of claim 7, wherein the additional ballast compartment is configured to hold a heavier than air gas.

9. The vehicle of claim 7, wherein the ballast compartment and the additional ballast compartment are disposed at opposite ends of the body.

10. The vehicle of claim 7, wherein the ballast compartment and the additional ballast compartment are disposed on opposite sides of the body.

11. A vehicle comprising:
an oblong, gas impermeable body having fins attached at an exterior back end thereof;
a heavier than air gas having a composition that is different from air;
a flexible barrier comprising a lightweight nylon or polyester scrim attached internally to the body and separating the body into a lift compartment configured to hold lighter than air gas and a ballast compartment configured to hold the heavier than air gas; and
a one-way discharge valve positioned within the ballast compartment and configured to open and to permit passage of the heavier than air gas from the ballast compartment to an exterior of the body at a predetermined threshold based on a pressure differential between an interior of the body and the exterior of the body caused by the ascent of the vehicle,
wherein upon release, through the one-way discharge valve, of the heavier than air gas from the ballast compartment, the flexible barrier moves, allowing the volume of the lift compartment to increase as the volume of the ballast compartment decreases, and
wherein the vehicle does not include a hopper external to the body or a pressure tank assembly.

12. The vehicle of claim 11, wherein the lift compartment is configured to hold helium or hydrogen.

13. The vehicle of claim 11, wherein the body comprises woven polyester, polyamide, or aramid fibers.

14. The vehicle of claim 11, wherein the lightweight nylon or polyester scrib is coated on both sides with polyurethane.

15. The vehicle of claim 11, wherein the one-way discharge valve is configured to selectively permit flow of the heavier than air gas directly from the ballast compartment to an exterior of the body when a predetermined altitude has been reached by the vehicle.

16. The vehicle of claim 11, wherein the heavier than air gas comprises at least one of carbon dioxide or sulfur hexafluoride.

* * * * *